United States Patent [19]
Lucatorto et al.

[11] Patent Number: 4,734,579
[45] Date of Patent: Mar. 29, 1988

[54] ULTRASENSITIVE METHOD FOR MEASURING ISOTOPE ABUNDANCE RATIOS

[75] Inventors: Thomas B. Lucatorto, Washington, D.C.; Charles W. Clark, Montgomery County, Md.; Tom J. Whitaker, Benton County, Wash.

[73] Assignee: Atom Sciences, Inc., Oak Ridge, Tenn.

[21] Appl. No.: 882,508

[22] Filed: Jul. 7, 1986

Related U.S. Application Data

[63] Continuation-in-part of Ser. No. 546,052, Oct. 27, 1983, Pat. No. 4,634,864.

[51] Int. Cl.$^4$ ............................................. B01D 59/44
[52] U.S. Cl. ..................................... 250/282; 250/288; 250/423 P
[58] Field of Search .................... 250/288, 423 P, 282; 204/157.2, 157.21, 157.22

[56] References Cited

U.S. PATENT DOCUMENTS

| | | | |
|---|---|---|---|
| 3,941,670 | 3/1976 | Pratt | 250/423 P |
| 4,020,350 | 4/1977 | Ducas | 250/423 P |
| 4,115,078 | 9/1978 | Jammer et al. | 250/423 P |
| 4,156,144 | 5/1979 | Pike et al. | 250/423 P |
| 4,166,219 | 8/1979 | Ausschmitt | 250/423 P |
| 4,336,230 | 6/1982 | Bethe et al. | 250/423 P |
| 4,442,354 | 4/1984 | Hurst et al. | 250/423 P |
| 4,636,287 | 1/1987 | Pike et al. | 204/157.22 |

OTHER PUBLICATIONS

"Laser Spectroscopy for Sensitive Detection", Whitaker et al., *Proceedings of SPIE*, vol. 286, Apr. 23-24, 1981.

Primary Examiner—Bruce C. Anderson
Attorney, Agent, or Firm—Pitts and Brittian

[57] ABSTRACT

An ultrasensitive mass spectrometry method based on multiphoton sub-Doppler resonance ionization to measure abundance sensitivities. The method preferentially ionizes a selected isotope in a sample by using Doppler-free resonant multiphoton ionization to produce an enhanced ratio of selected isotopes. Background species are separately ionized and rejected. As necessary or desired, selected isotope ions are preferentially ionized by using a second Doppler-free resonant multiphoton ionization to provide an additional isotope enhancement. The ions produced are injected into a mass spectrometer. Isotopic spectrum analysis of the ions is performed by the spectrometer and the ions are then detected by a detector such as a particular photon multiplier capable of observing a single ion. In one embodiment, at least one of the steps of preferentially ionizing the selected isotope is accomplished by two counter propagating laser beams of slightly different frequencies. Further improved sensitivity is achieved by: (1) using a frequency offset of the laser frequency in an amount proportional to the laser intensity to overcome AC Stark shifts, and (2) withdrawing ions for mass separation from only the central portion of the laser interaction volume.

22 Claims, 4 Drawing Figures

ULTRASENSITIVE METHOD FOR MEASURING ISOTOPE ABUNDANCE RATIOS

BACKGROUND ART

This is a continuation-in-part application filed relative to the prior parent application Ser. No. 546,052, filed Oct. 27, 1983, and now U.S. Pat. No. 4,634,864.

TECHNICAL FIELD

This invention relates to an ultrasensitive method for measuring isotope abundance ratios and includes the step of performing Doppler-free resonant multiphoton ionization of sample atoms/molecules.

A number of significant analysis applications require measurement of extremely low abundances of a particular isotope. For example, it is necessary to measure extremely low abundances of a particular isotope in archeology dating where radioactive species are used as chronometers. Often $^{14}C$ is used for such dating. Measurement of low abundances is also used in geology and cosmology where $^{10}Be$ is used as a tracer. Moreover, selected tracer isotopes are used in biological and industrial applications and in the detection of fission-product isotopes for environmental monitoring. Often such applications require instrument sensitivities which will allow measurements of ratios as small as 1 part in $10^{16}$. An instrument capable of measuring such an abundance ratio would have an abundance sensitivity which exceeds $10^{16}$. This abundance sensitivity is the quantity that defines the abilitiy of a mass spectrometer to measure a given abundance ratio of two neighboring isotopes of an element in the middle of the periodic table.

Three known techniques are presently used in measuring extremely low isotope abundance ratios. In one technique, a conventional mass spectrometer employs electric and magnetic fields to perform the mass selection. In another technique, high energy (MeV) mass spectrometry is used in conjunction with a tandem accelerator. Moreover, radioactivity counting can be employed.

Conventional mass spectrometers are not generally capable of abundance sensitivities beyond $10^9$, and frequently cannot achieve even that sensitivity because of isobaric and molecular interferences. Certain high energy spectrometers are presently capable of abundance sensitivity measurements in the range of $10^{16}$ for certain light elements, for example $^{14}C$ and $^{36}Cl$. These spectrometers prove useful for providing ultrasensitive measurements on a significant group of elements. However, these tandem accelerator-based spectrometers have several disadvantages. First, only elements having a negative ion bound state can be measured. Additionally, the ability to discriminate between isobars decreases markedly for elements having an atomic number greater than forty. Discrimination between isobars in these machines is also ineffective for a certain class of elements regardless of the atomic number. Further, such spectrometers are costly to build, operate and maintain. Conventional radioactivity counting has a major drawback in that it cannot be applied to the rare stable isotopes of interest and becomes impractical for small samples of long-lived nuclides.

Recently, a new technique of mass spectrometry, commonly referred to as resonance ionization mass spectrometry or "RIMS", has been demonstrated successfully. Such technique is referred to in the International Journal of Mass Spectrometry Ion Physics, Volume 34, pages 89–97 (1980), in an article authored by D. W. Beekman, T. A. Callcott, S. D. Kramer, E. T. Arakawa, and G S. Hurst. This technique employs resonantly enhanced laser multiphoton ionization as the ion source for a conventional mass spectrometer. For example, see U.S. Pat. No. 3,987,302 which is incorporated by reference herein together with the above-identified article. As currently conceived, RIMS has the potential to eliminate isobaric and molecular interferences. The ultimate abundance sensitivity of a RIMS apparatus is limited by the sensitivity of the mass spectrometer which is $10^9$ for conventional mass spectrometers.

Another reference to resonance ionization is an article entitled "Doppler-Cancelled, Two-Photon Resonance Ionization Spectroscopy", authored by Tom J. Whitaker and Bruce A. Bushaw, as published in *Proceedings of the SPIE International Society for Optical Engineering*, 286, pages 40–46 (1981).

None of the prior methods or machines provides for ultrasensitive analysis for a wide range of elements.

Accordingly, it is an object of the present invention to provide a method for ultrahigh abundance sensitivity measurement incorporating a mass spectrometer. Such sensitivity measurements can be made on a large group of commercially and scientifically significant elements.

Another object of the present invention is to provide a method for measuring isotope abundance ratios incorporating a step of preferentially ionizing a selected isotope by using Doppler-free resonant multiphoton ionization.

It is also an object of the present invention to provide such an ultrahigh abundance sensitivity method capable of determining an abundance ratio of 1 part in $10^{14}$ or smaller.

It is another object of the present invention to improve the isotopic abundance sensitivity by a Doppler-free resonant multiphoton ionization prefilter which removes a major fraction of the more abundant, common isotopic species prior to determining the abundance ratio of the limited specie.

It is a further object of the present invention to overcome the loss in abundance sensitivity caused by AC Stark shifts produced when an atom interacts with an oscillating electric field as produced by a laser beam.

These and other objects of the present invention will be more clearly understood from consideration of the following description taken together with the accompanying drawings.

DISCLOSURE OF THE INVENTION

In accordance with various features of the invention, a method is provided for measuring ultrahigh abundance sensitivities. The method can be used for measuring the isotope abundance ratio between a selected or desired isotope and at least one other isotope of the same or a different element which is referred to as a background isotope or isotopes. The process includes the steps of producing a vapor of certain atoms/molecules of a sample of a chemical sample being analyzed. A prefiltering stage follows in which the background isotope(s) is preferentially ionized by using Doppler-free resonant multiphoton ionization and the ions of the background isotope(s) thus created are swept out of the flow by an electric field. The selected isotope is then preferentially ionized by using Doppler-free resonant multiphoton ionization to produce an enhanced ratio of selected isotope to unwanted species. As is necessary or desired, the selected isotope ions are preferentially ionized by a second Doppler-free resonant multiphoton ionization to provide additional isotope enhancement. Applying a frequency offset that is proportional to the intensity of the laser beam used for the resonant ionization overcomes the loss in selectivity caused by AC Stark shifts. The ions produced are injected into a mass spectrometer and an isotopic separation is performed. The ions are then detected in the preferred embodiment by a particle multiplier capable of observing a single ion.

BEST MODE FOR CARRYING OUT THE INVENTION

Figure 1:
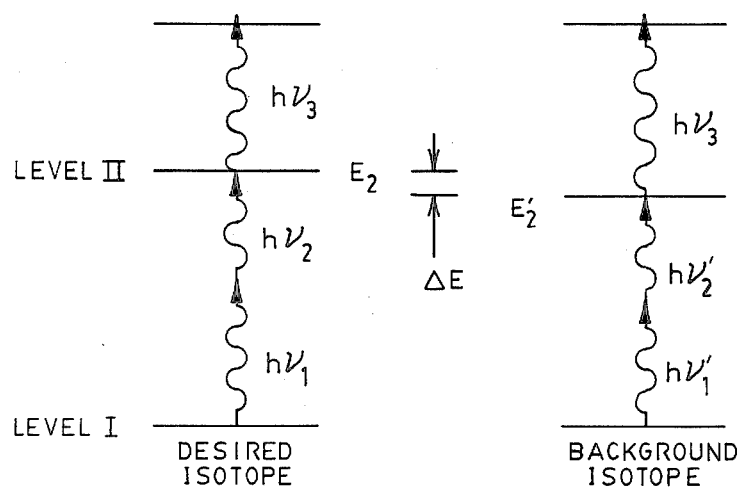
FIG. 1 illustrates the relevant energy levels of an atom or molecule including two isotopic species for which an abundance ratio is to be determined, the desired isotope and the background isotope.

The resonant response of an atom to a radiation field can be made independent of the velocity of the atom, i.e., the resonant response is Doppler-free. In this connection, the radiation field is chosen in such a way that the overall velocity-induced Doppler-shift associated with the resonance is zero. FIG. 1 illustrates the energy levels of two isotopic species of an atom which is in two-photon resonance with the radiation field. This resonance is obtained when the energy of the excited atom is equal to $h\nu_1$ plus $h\nu_2$ where h is Planck's constant and $\nu_1$, $\nu_2$ are the frequencies of the radiation. The resonance will be Doppler-free if the atom absorbs one photon from each of two counter-propagating laser beams with $h\nu_1 + h\nu_2 = E_2$, where $E_2$ is the energy of level II, and $\nu_1$ is equal to or nearly equal to $\nu_2$. It will be noted that the beam frequencies are depicted. The resonance is Doppler-free because the Doppler-shift of the atom relative to one of the counter-propagating beams is cancelled to the first order by the Doppler-shift of the atom relative to the other laser beam.

The process of the present invention employs a two-photon Doppler-free transition since for most vapors the Doppler-shift of single-photon transitions is comparable to or greater than the isotope shift. Moreover, the presence of a Doppler-shift means that only a small subgroup of atoms having a narrowly defined velocity can be resonant with a narrow bandwidth laser at any given laser frequency. The first effect severely limits the isotopic enhancement factor achievable in a resonantly enhanced multiphoton ionization which is not Doppler-free. The second effect severely limits the sensitivity of a process which is not Doppler-free.

To ensure maximum isotopic selectivity for the Doppler-free process, non-resonant isotopes must be prevented from undergoing a two-photon transition to the excited state. A certain velocity of such non-resonant isotopes are fortuitously Doppler-shifted into resonance with one of the laser beams. This prevention can be accomplished by two methods. First, if the initial state (Level I) of the atom/molecule is a state of zero orbital momentum (an "S" state) and the excited state is also a "S" state, then the absorption of two photons from one beam will be prevented when both beams are circularly polarized. The absorption of a single photon from each beam is allowed if the two beams are circularly polarized with the same helicity. Such prevention can also be accomplished by using two slightly different frequencies, $\nu_1$ and $\nu_2$, such that $h\nu_1 + h\nu_2$ is the energy of the excited state of the desired isotope and the absolute value of $\nu_1 - \nu_2$ is somewhat larger than the Doppler width associated with the frequency $\nu_1$. This method applies in all cases.

The multiphoton ionization process is completed by the addition of one or more photons. FIG. 1 shows the addition of one photon of frequency $\nu_3$, but additional resonant photons can be used if the ionization potential is not within the reach of a conventionally available frequency $\nu_3$.

FIG. 1 also illustrates ionization of a "desired" isotope and a "background" isotope. It can be seen that the energy levels $E_2$ and $E_2'$ of the excited states of these two isotopes can differ by a small amount, $\Delta E$.

Figure 2:
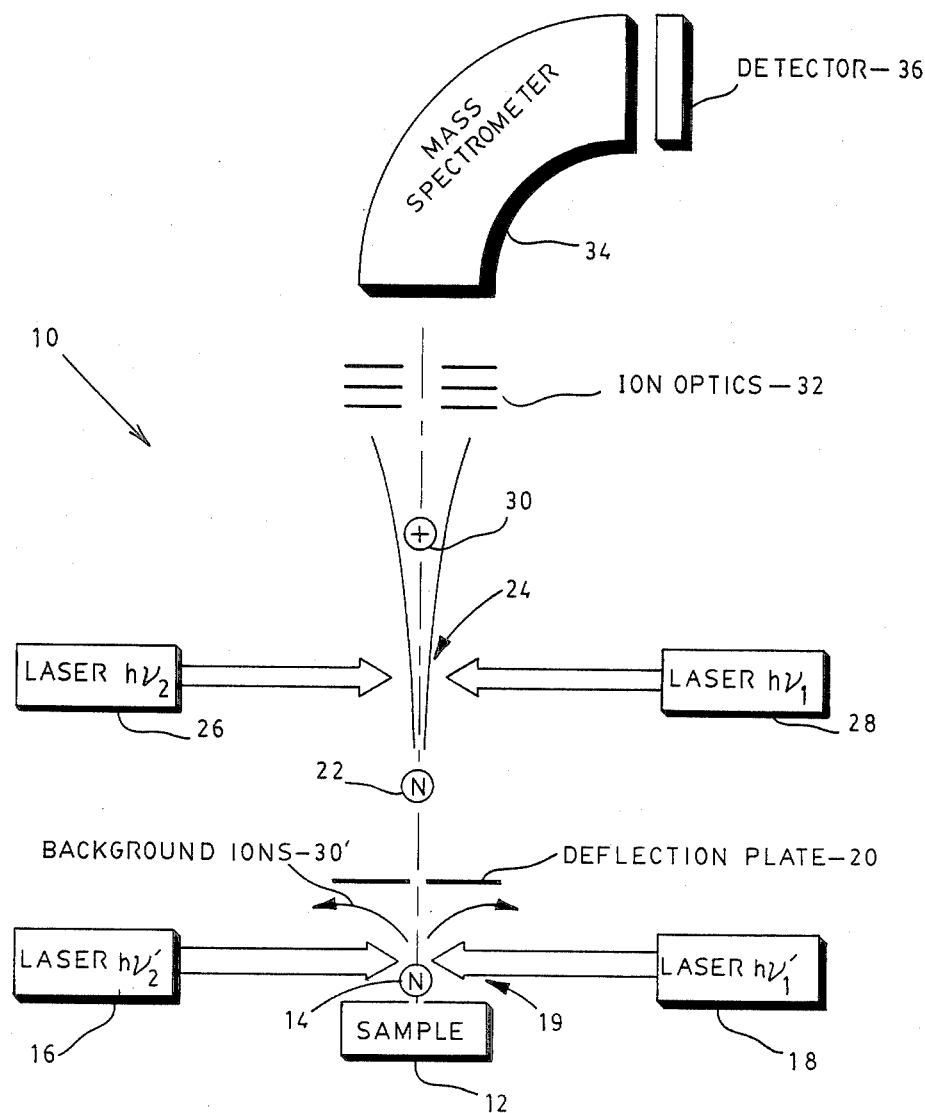
FIG. 2 illustrates a schematic diagram of the various components used in accomplishing the method of the present invention. This figure illustrates the two stage version of the process, a prefilter stage followed by a stage giving selective ionization of the desired isotope.

The ionization indicated in FIG. 1 can be accomplished by a system generally indicated at 10 in FIG. 2. This system 10 is designed for making ultrahigh abundance sensitivity measurements for a large group of commercially and scientifically important elements. A holder loaded with the sample element is illustrated at 12 in FIG. 2. This sample includes atoms and/or molecules of a selected isotope for which an abundance sensitivity measurement is to be made. The abundance ratio between a selected isotope of a given chemical element and at least one other isotope having a different atomic mass or mass number in the sample 12 can be measured by the present method up to ratios of 1 part in $10^{14}$. This sample can be a solid, liquid or gas as will be discussed in greater detail hereinafter.

For a solid sample an energetic beam, such as an argon ion beam (not shown) can be directed against the sample 12 to sputter neutral atoms/molecules as at 14 from the sample in an ultrahigh vacuum. Secondary ions are electrostatically rejected from the region above the sample surface. Thus, a cloud of much more abundant neutral atoms from the sample 12 remain for analysis. This sputtering technique is described in greater detail in U.S. Pat. No. 4,442,354, and entitled "Sputter Initiated Resonance Ionization Spectrometry", which patent is incorporated herein by reference. This sputtering technique can be used to operate on samples which are liquid or solid at normal temperature. The sample can also be vaporized by heating in an appropriate oven or by laser ablation [See S. Mayo, et al., Anal. Chem. 54, 553–556 (1982)]. For obtaining the highest isotopic abundance sensitivities, it is preferred that the sample 12 be chemically purified. Moreover, the element to be measured is preferably a major constituent of the sample.

FIG. 2 illustrates how Doppler-free resonance ionization is used in two stages to provide a highly enriched source of ions of the desired isotope for analysis by a conventional mass spectrometer. The first stage indicated at 19 consists of two laser beams, derived from laser sources 16, 18 of frequencies $v_1'$ and $v_2'$ chosen to perform Doppler-free resonance ionization (with possibly the aid of a third frequency $v_3'$, not shown) on the background isotopic species. If more than one background species is present, additional lasers can be added. Conditions can be chosen so that 90% of the background species are ionized and deflected (as at 30') away from passing into the second stage using a deflection plate 20 to which is applied an appropriate voltage. Neutral atoms/molecules are not deflected and pass into region 22. This first stage acts as a prefilter which enriches the desired isotope relative to the backround isotope by an order of magnitude and thereby provides an increase in isotopic abundance sensitivity by the same amount. In addition, this prefiltering reduces the charge exchange ionization in the second stage by an order of magnitude. The charge exchange limits atomic or molecular density which, in turn, limits the sensitivity achievable in a given time. Thus, the prefilter also reduces the measurement time for a given sensitivity.

The second stage, indicated by area 24 in FIG. 2, provides the selective ionization of the desired isotopic species. Two counter-propagating laser beams from sources 26, 28, of frequencies $v_1$ and $v_2$ are chosen to perform Doppler-free resonance ionization (with possibly the aid of a laser frequency $v_3$, not shown) on the desired isotopic species. The laser-ionized atom/molecule 30 illustrated in FIG. 2 is extracted from the laser-atom interaction region of the second stage. The system of ion injection optics illustrated generally at 32 serves to efficiently extract the ions and to accelerate and focus the ions in a suitable manner for the mass spectrometer 34. As necessary or desired, the ions are also colliminated prior to being injected into the mass spectrometer. Such technology is conventional and well known by those skilled in the art.

The mass spectrometer 34 is of conventional design. Suitable conventional mass spectrometers such as the magnetic sector, the quadrupole or the time of flight can be used. This spectrometer 34 has an abundance sensitivity of at least $10^7$, which is a value readily available on many commercial mass spectrometers. Further, a detector 36 at the output of the mass spectrometer 34 is of conventional design and commercially available. Preferably it is a charged particle multiplier capable of counting single ions.

Figure 3:
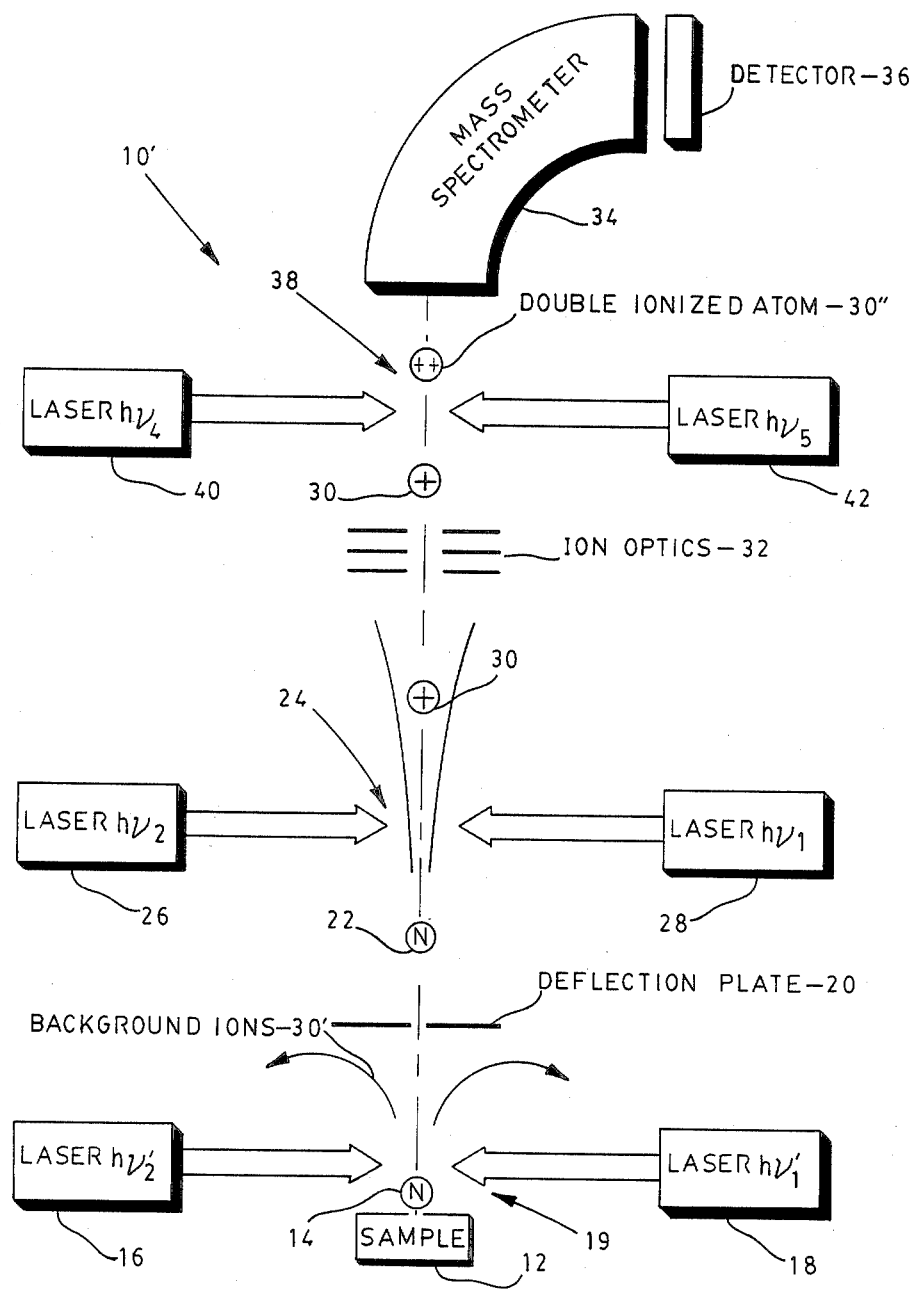
FIG. 3 represents a three-stage version of the method in which desired isotope ions produced by the method associated with FIG. 2 are preferably ionized by an additional Doppler-free resonant multiphoton ionization to provide an additional isotope enhancement.

For many of the elements of the periodic table, for example, Ca, Sr, Ba, Lu, Ce, Nd, Th, and U, a resonant multiphoton ionization on a singly-charged ion can be used to produce the doubly-charged ion. This procedure is illustrated schematically in FIG. 3. FIG. 3 depicts the third stage of ionization generally indicated at 38 to produce the doubly-ionized atom 30''. This third stage of ionization is accomplished in a Doppler-free mode with lasers from sources 40, 42 and frequencies $v_4$ and $v_5$, in order to produce an additional enhancement of the selected isotope into the doubly-charged state 30''.

If the mass spectrometer 34 is set for exactly half the mass of the selected isotope, then the isotopic abundance sensitivity for this isotope is the product of the enhancement factors of each ionization stage multiplied by the abundance sensitivity of the mass spectrometer. Often the enhancement factor of the third ionization stage is comparable to that of the second, resulting in significant contribution to the overall isotopic abundance sensitivity by the additional stage 38. Thus, the two stage process illustrated in FIG. 2 produces an enhanced ratio of the desired isotope by using Doppler-free resonant multiphoton ionization first to eliminate the majority of background isotopic species in the prefilter and then by using a second stage of ionization to selectively create the ions of desired isotopic species. The three stage process illustrated in FIG. 3 includes a further stage of preferentially ionizing selected isotope ions by using a second Doppler-free resonant multiphoton ionization to provide an additional isotope enhancement.

Although a high level of sensitivity is achieved through use of the process illustrated in FIGS. 2 and 3, certain problems can be created by a shifting of the resonance with respect to the laser wavelengths (frequencies). This effect is produced because the wavelength of a specific atomic transition is shifted when the atom interacts with an oscillating electric field, such as the electromagnetic field of a laser beam. This effect is well known and is referred to as the AC Stark shift. In the case of two-photon transitions, the shift is due to virtual transitions between atomic levels caused by non-resonant light. This is described in Physical Review Letters, 34, 1–4 (1975).

When a pulsed laser is used to produce resonantly enhanced ionization, the intensity varies with time and position. Spatial dependence can be minimized in resonance ionization by techniques designed to utilize only those ions formed at the center of the laser interaction volume. However, the time-varying intensity of the laser pulse will cause the time-varying AC Stark shift. Two detrimental effects can result from the shift: the desired resonance will be shifted away from the laser wavelength, and interfering resonances can be shifted toward the laser wavelength. The latter is particularly detrimental to the selectivity achieved by Doppler-free resonance ionization.

In accordance with an improved embodiment of the present invention, both of the above-stated effects can be avoided by imposing upon the laser frequency an "offset" frequency that is proportional to the laser intensity. If the resonance frequency of an unperturbed atomic energy level is defined by $v_0$, the resonance frequency in the presence of a laser of intensity, I, is given by:

$$v = v_0 + SI,$$

where S is a constant of proportionality. To overcome the shift, the ideal frequency offset, SI, of the laser should be such that the total laser frequency, $v_t$, is given by:

$$v_t = v_0 + SI.$$

In this way, the laser will always be exactly resonant with the energy level of the desired isotope and thus the selectivity of the Doppler-free resonance ionization will be optimized.

A time-varying change, or offset, in a laser frequency is known as a "chirp". One method of producing a chirp is through the use of an electro-optic device whose index of refraction changes with an applied voltage. To change the frequency of an incoming laser radiation, the index of refraction must change as the light transmits through the electro-optic device. Thus, to produce a laser frequency offset or chirp to overcome the AC Stark shift, a voltage must be applied such that the rate of change of the voltage has the appropriate functional relationship to the laser intensity. Under these conditions, the AC Stark shift is minimized. This, together with the extraction of ions from only a small region of the interactive region of the laser, results in optimization of selectivity of the process.

To implement the use of the frequency chirp to improve the selectivity of the ionization process, the lasers $h\nu_2$ and $h\nu_4$ in FIG. 3 would be of a type incorporating an appropriate intensity dependent frequency shift given by $S_2I_2$ and $S_4I_4$ where $S_2$ is the measured AC Stark shift constant for the neutral atomic or molecular species of interest, $I_2$ the intensity of the $h\nu_2$ laser, $S_4$ is the measured AC Stark shift constant for the singly ionized species of interest, and $I_4$ the intensity of the $h\nu_4$ laser.

Figure 4:
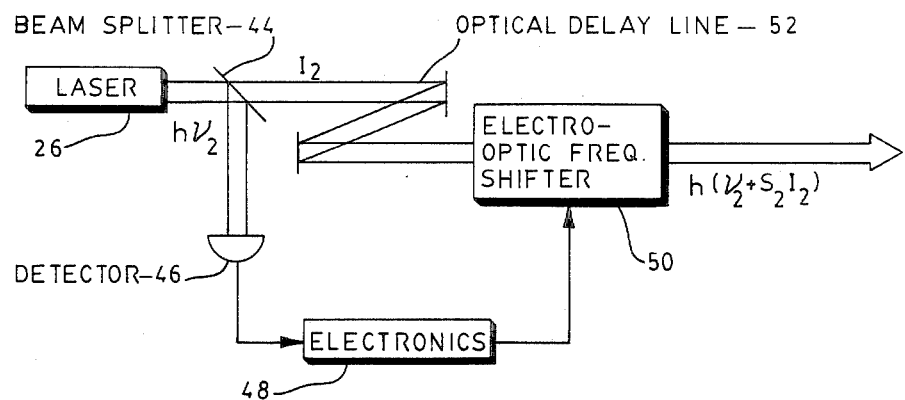
FIG. 4 illustrates schematically an improved embodiment of the present invention involving means for overcoming a shift in atomic transition known as the AC Stark shift.

Frequency shifting of a laser is an established technique and one way of achieving the appropriate intensity dependent frequency shifts is indicated in FIG. 4 as used for the laser of frequency $\nu_2$ from source 26. A beam splitter 44 directs a small amount of the laser intensity $I_2$ to a high speed detector 46 which provides an output voltage proportional to the intensity. An electronic circuit 48 translates this voltage into a driving voltage for an electro-optic frequency shifter 50. The electronic circuit is designed so that the relationship between the voltage from the detector and the output driving voltage to the electro-optic frequency shifter is adjustable. For an atom with AC Stark shift constant $S_2$, the relationship is adjusted to give a shift $S_2I_2$. An optical delay line 52 is inserted between the laser 26 and the frequency shifter 50 to allow for the time delay inherent in the detector 46, the electronic device 48, and the frequency shifter 50. The output energy is thus $h(\nu_2+S_2I_2)$.

From the foregoing detailed description, it will be recognized that an ultrasensitive method has been provided for measuring the abundance sensitivity of samples containing selected isotopic species. The method incorporates the process of preferentially ionizing selected isotopic species with a laser. Such ionization of the background isotopic species is used in a prefilter stage to enhance the ratio of desired isotopic species to background species. The ionization of the desired isotopic species is coupled with a system of ion optics to inject the laser-produced ions into a mass spectrometer and the ions are detected with a particle multiplier. The ions are created by Doppler-free resonant multiphoton ionization. The Doppler-free resonant process exploits the optical isotope shift to enhance the number of ions of a selected isotope relative to the number of ions of the background isotope. The laser-produced ions are analyzed by the mass spectrometer. The total abundance sensitivity is obtained from the product of the enhancement factor multiplied by the abundance sensitivity of the mass spectrometer. Enhancement factors of $10^7$ are achievable, which when multiplied by the abundance sensitivity of $10^7$ obtainable with a conventional mass spectrometer, produce an overall attainable abundance sensitivity of $10^{14}$. All atoms of the desired isotope in a gaseous sample being analyzed are resonant with the laser when the Doppler-free mode is used. This feature provides a high level of sensitivity for the ionization process in a mass spectrometer since in principle nearly every atom of a selected species in the sample can be ionized. The process works with a sample including molecules or atoms. Counter propagating beams can originate from the same laser. Moreover, a second laser can be used for the second stage of ionization. The lasers can be synchronously pulsed, operated in a mode to produce a continuous radiation output or a combination thereof. The initial energy level of the atoms/molecules of the vaporized sample can be the ground state of the atoms/molecules or it can be greater than the ground energy level. Through the use of an offset in the frequency of the laser that is related to the laser intensity, the detrimental AC Stark shift is overcome and further sensitivity is achieved.

While preferred embodiments have been shown and described, it will be understood that there is no intent to limit the invention by such disclosure, but rather it is intended to cover all modifications and alternate constructions falling within the spirit and the scope of the invention as defined in the appended claims and their equivalents.

We claim:

1. A method for measuring the isotope abundance ratio between a selected isotope and at last one other isotope having a different atomic mass or atomic number in a sample of a given chemical element, said abundance measuring method being capable of determing ultrasensitive abundance ratios, said method comprising;

producing a vapor of certain atoms/molecules of said sample of said chemical element;

preferentially ionizing said selected isotope within said vapor by Doppler-free resonant multiphoton ionization using a laser beam of at least one selected frequency to achieve said ionization, said laser frequency including a frequency offset in proportion to the intensity of said laser beam, said offset being of a value sufficient to overcome loss in abundance sensitivity due to AC Stark shifts caused by time-varying laser intensity;

injecting ions produced by said ionization into a mass spectrometer;

performing isotopic spectrum analysis of said ions by said mass spectrometer; and detecting ions analyzed by said mass spectrometer to determined said isotope abundance ratio between said selected isotope and said at least one other isotope.

2. The method of claim 1 further comprising the steps, interposed between said producing of said vapor and said ionizing of said selected isotope of:

preferentially ionizing said at least one other rsotope by Doppler-free resonant multiphoton ionization using a second laser beam of at least ohe selected frequency to achieve said ionization of said at least one other isotope; and electrostatically removing at least a portion of said ions of said at least one other isotope to achieve a prefiltering removal of a major fraction of said at least one other isotope and thereby enhance an abundance ratio between said selected isotope and said at least one other isotope prior to said ionization of said selected isotope.

3. The method of claim 1 further comprising the steps, interposed between said producing of said vapor and said ionizing of said selected isotope of:

preferentially ionizing said at least one other isotope by Doppler-free resonant multiphoton ionization using a second laser beam of at least one selected frequency to achieve said ionization of said at least one other isotope, said frequency of said second laser beam including a frequency offset in proportion to the intensity of said second laser beam, said offset being of a value sufficient to overcome loss in abundance sensitivity due to the AC Stark shifts; and electrostatically removing at least a portion of said ions of said at least one other isotope to achieve a prefiltering removal of a major fraction of said at least one other isotope and thereby enhance an abundance ratio between said selected isotope and said at least one other isotope prior to said ionization of said selected isotope.

4. The method of claim 1 further comprising a second stage of preferentially ionizing said selected isotope by Doppler-free resonant multiphoton ionization using a third laser beam of at least one selected frequency to achieve said ionization, said frequency of said third laser beam including a frequency offset in proportion to the intensity of said third laser beam, said offset being sufficient to overcome loss in abundance sensitivity caused by AC Stark shifts.

5. The method of claim 1 wherein said selected frequency of said laser beam, including said offset frequency, is produced by passing an output beam from a laser source through an electro-optic frequency shifter having a controllable index of refraction and providing an input voltage to said electro-optic frequency shifter to control said index of refraction, said input voltage being proportional to the intensity, I, of said beam from said laser source and to the AC Stark shift constant, S.

6. The method of claim 5 wherein said input voltage to said electro-optic frequency shifter is obtained by passing a selected portion of said laser beam from said laser source to a detector to obtain an output signal proportional to said intensity, I, and conditioning said detector output signal in a conditioning circuit to provide a voltage corresponding to the product of said intensity, I, and said AC Stark shift constant, S.

7. The method of claim 6 further comprising the step of passing said laser beam from said laser source through a delay line prior to passing through said electro-optic frequency shifter to compensate for time delays of said laser detector, said conditioning circuit and said electro-optic frequency shifter.

8. The method of claim 1 wherein said laser beam produces a circularly polarized laser beam thereby preventing ionization of a non-resonant isotope fortuitously Doppler-shifted into resonance by said laser beam.

9. The method of claim 4 wherein at least one of said steps of preferentially ionizing said selected isotope is accomplished by two counter-propagating laser beams of slightly different frequencies whereby ionization for any velocity subgroup of a non-resonant isotope is prevented.

10. The method of claim 1 wherein ionization is accomplished by two counter-propagating laser beams originating from the same laser source.

11. The method of claim 4 wherein said preferentially ionization of said selected isotope using Doppler-free resonant multiphoton ionization utilizes at least one laser beam producing two-photon excitation, and wherein said second Doppler-free resonant multiphoton ionization of ions of said selected isotope is accomplished by at least one additional laser beam.

12. The method of claim 11 wherein said laser beams are sychronously pulsed.

13. The method of claim 11 wherein at least one laser beam is synchronously pulsed and at least one laser beam is a continuous radiation.

14. The method of claim 11 wherein all of said laser beams have a continuous output of radiation.

15. The method of claim 1 wherein the initial energy level of the atoms/molecules of said vaporized sample is the ground state of said atoms/molecules.

16. The method of claim 1 wherein the initial energy level of the atoms/molecules of said vaporized sample is greater than the ground energy level of said atoms/molecules.

17. A method for measuring the isotope abundance ratio between a selected isotope and at least one other isotope having a different atomic mass or atomic number in a sample of a given chemical element, said abundance measuring method being capable of determining ultrasensitive abundance ratios, said method comprising:

producing a vapor of certain atoms/molecules of said sample of said chemical element;

preferentially ionizing said at least one other isotope by Doppler-free resonant multiphoton ionization using a first laser beam of at least one selected frequency to achieve said ionization of said at least one other isotope, said frequency of said first laser beam including a frequency offset in proportion to the intensity of said first laser beam, said offset being of a value sufficient to overcome loss in abundance sensitivity due to the AC Stark shift;

electrostatically removing said ions of said at least one other isotope to achieve a prefiltering removal of a major fraction of said at least one other isotope and thereby enhance an abundance ratio between said selected isotope and said at least one other isotope prior to said ionization of said selected isotope;

preferentially ionizing said selected isotope within said vapor by Doppler-free resonant multiphoton ionization using a second laser beam of at least one selected frequency to achieve said ionization, said frequency of said second laser beam including a frequency offset in proportion to the intensity of said second laser beam, said offset being of a value sufficient to overcome loss in abundance sensitivity due to AC Stark shifts;

injecting ions produced by said ionization into a mass spectrometer;

performing isotopic spectrum analysis of said ions by said mass spectrometer; and detecting ions analyzed by said mass spectrometer to determine said isotope abundance ratio between said selected isotope and said at least one other isotope.

18. A method for measuring the isotope abundance ratio between a selected isotope and at least one other isotope having a different atomic mass or atomic number in a sample of a given chemical element, said abundance measuring method being capable of determining ultrasensitive abundance ratios, said method comprising:

producing a vapor of certain atoms/molecules of said sample of said chemical element;

preferentially ionizing said at least one other isotope by Doppler-free resonant multiphoton ionization using a first laser beam of at least one selected frequency to achieve said ionization of said at least one other isotope, said frequency of said first laser beam including a frequency offset in proportion to the intensity of said second laser beam, said offset being of a value sufficient to overcome loss in abundance sensitivity due to AC Stark Shifts;

electrostatically removing said ions of said at least one other isotope to achieve a prefiltering removal of a major fraction of said at least one other isotope and thereby enhance an abundance ratio beween said selected isotope and said at least one other isotope prior to said ionization of said selected isotope;

preferentially ionizing said selected isotope within said vapor by Doppler-free resonant multiphoton ionization using a second laser beam of at least one selected frequency to achieve said ionization, said frequency of said second laser beam including a frequency offset in proportion to the intensity of said second laser beam, said offset being of a value sufficient to overcome loss in abundance sensitivity due to AC Stark shifts:

preferentially ionizing said ions of selected isotope by Doppler-free resonant multiphoton ionization using a third lazer beam of at least one selected frequency to achieve said ionization, said frequency of said third laser beam including a frequency offset in proportion to the intensity of said third laser beam, said offset being sufficient to overcome loss in abundance sensitivity caused by AC Stark shifts;

injecting ions produced by said ionization into a mass spectrometer;

performing isotopic spectrum analysis of said ions by said mass spectrometer; and detecting ions analyzed by said mass spectrometer to determine said isotope abundance ratio between said selected isotope and said at least one other isotope.

19. The method of claim 18 wherein said offset frequency of said selected frequencies of said first, second and third laser beams is produced by passing an output from a first, second and third laser source, respectively through an electro-optic frequency shifter having a controllable index of refraction and providing an input voltage to said electro-optic frequency shifter to control said index of refraction, said input voltage being proportional to the intensity of said first, second and third laser beams respectively, and to the AC Stark shift constant produced by each of said first, second and third laser beams, respectively.

20. The method of claim 19 wherein said input voltage to said electro-optical frequency shifter is obtained by passing a selected portion of each of said first, second and third laser beams to a detector to obtain an output signal proportional to individual of said laser beams, and conditioning said detector output signals in a conditioning circuit to provide said input voltage to said electro-optic frequency shifter corresponding to the product of said laser beam intensity and said AC Stark shift constant.

21. A method for measuring the isotope abundance ratio between a selected isotope and at least one other isotope having a different atomic mass or atomic number in a sample of a given chemical element, said abundance measuring method being capable of determining ultrasensitive abundance ratios, said method comprising;

producing a vapor of certain atoms/molecules of said sample of said chemical element;

preferentially ionizing said at least one other isotope by Doppler-free resonant multiphoton ionization using a first laser beam of at least one selected frequency;

electrostatically removing at least a portion of said ions of said at least one other isotope to achieve a prefiltering removal of a major fraction of said at least one other isotope and thereby enchance an abundance ratio between said selected isotope and said at least one other isotope;

preferentially ionizing said selected isotope within said vapor by Doppler-free resonant multiphoton ionization using a second laser beam of at least one selected frequency to achieve said ionization, said second laser frequency including a frequency offset in proportion to the intensity of said second laser beam, said offset being of a value sufficient to overcome loss in abundance sensitivity due to AC Stark shifts caused by time-varying laser intensity;

injecting ions produced by said ionization of said selected isotope into a mass spectrometer;

performing isotopic spectrum analysis of said ions by said mass spectrometer; and detecting ions analyzed by said mass spectrometer to determined said isotope abundance ratio between said selected isotope and said at least one other isotope.

22. The method of claim 21 wherein said frequency of said first laser beam includes a frequency offset in proportion to the intensity of said first laser beam, said offset being of a value sufficient to overcome loss in abundance sensitivity due to AC Stark shifts caused by time-varying laser intensity.

* * * * *